US009632915B2

(12) United States Patent
Davis et al.

(10) Patent No.: US 9,632,915 B2
(45) Date of Patent: Apr. 25, 2017

(54) HISTORICAL CONTROL FLOW VISUALIZATION IN PRODUCTION DIAGNOSTICS

(71) Applicant: MICROSOFT TECHNOLOGY LICENSING LLC., Redmond, WA (US)

(72) Inventors: Jackson Davis, Carnation, WA (US); Maciej Foks, Warsaw (PL)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 0 days.

(21) Appl. No.: 14/527,512

(22) Filed: Oct. 29, 2014

(65) Prior Publication Data

US 2016/0124834 A1 May 5, 2016

(51) Int. Cl.
G06F 9/44 (2006.01)
G06F 11/36 (2006.01)
G06F 9/30 (2006.01)
G06F 11/07 (2006.01)

(52) U.S. Cl.
CPC ........ *G06F 11/366* (2013.01); *G06F 9/30192* (2013.01); *G06F 11/3612* (2013.01); *G06F 11/3636* (2013.01); *G06F 11/3644* (2013.01); *G06F 11/3664* (2013.01); *G06F 11/3676* (2013.01); *G06F 11/0721* (2013.01); *G06F 11/0769* (2013.01); *G06F 11/0778* (2013.01)

(58) Field of Classification Search
None
See application file for complete search history.

(56) References Cited

U.S. PATENT DOCUMENTS

| 5,450,586 | A | | 9/1995 | Kuzara et al. | |
|---|---|---|---|---|---|
| 5,694,539 | A | * | 12/1997 | Haley | G06F 11/366 714/38.1 |
| 6,003,143 | A | * | 12/1999 | Kim | G06F 11/323 706/46 |

(Continued)

FOREIGN PATENT DOCUMENTS

| EP | 1331566 a2 | 7/2003 |
|---|---|---|
| EP | 1970803 A2 | 9/2008 |

OTHER PUBLICATIONS

Langdon, Jon, "Production Diagnostics Improvements in CLR 4", Published on: May 2010, Available at: http://msdn.microsoft.com/en-us/magazine/ee336311.aspx.

(Continued)

*Primary Examiner* — Isaac T Tecklu (57) ABSTRACT

A diagnostic tool can dynamically instrument an application to collect program control flow information using one or more non-stopping production breakpoints. Analyzed program control flow information can be displayed. Dynamic code rewriting techniques can be used to change the production software without deploying new source code. The information collected at the non-stopping breakpoint can include the actual control flow that an instance of the production application took to reach the breakpoint in addition to information about the data. The analyzed control flow information can be visualized in a diagnostic tool allowing a user to see the path an execution of the program took to arrive at a particular breakpoint.

20 Claims, 8 Drawing Sheets

(56) References Cited

U.S. PATENT DOCUMENTS

| | | | |
|---|---|---|---|
| 6,219,803 B1 | 4/2001 | Casella et al. | |
| 6,349,406 B1 | 2/2002 | Levine et al. | |
| 6,745,344 B1 | 6/2004 | Joshi et al. | |
| 6,854,073 B2 | 2/2005 | Bates et al. | |
| 6,901,581 B1 | 5/2005 | Schneider | |
| 6,981,243 B1 | 12/2005 | Browning et al. | |
| 7,155,708 B2 | 12/2006 | Hammes et al. | |
| 7,690,941 B2 | 4/2010 | Caveney et al. | |
| 7,716,643 B2 | 5/2010 | Goldin | |
| 7,849,445 B2 | 12/2010 | Tran | |
| 7,900,011 B2 | 3/2011 | Amundsen et al. | |
| 8,060,866 B2 | 11/2011 | Weatherbee et al. | |
| 8,090,989 B2 | 1/2012 | Law et al. | |
| 8,091,074 B2 | 1/2012 | Lyon-Smith | |
| 8,136,096 B1* | 3/2012 | Lindahl | G06F 11/364 714/45 |
| 8,209,288 B2 | 6/2012 | Friedman et al. | |
| 8,302,006 B2 | 10/2012 | Stanek et al. | |
| 8,522,209 B2 | 8/2013 | Wintergerst et al. | |
| 8,752,017 B2 | 6/2014 | Hossain et al. | |
| 8,935,673 B1 | 1/2015 | Ashkenazi et al. | |
| 9,111,033 B2 | 8/2015 | Bates | |
| 9,239,773 B1 | 1/2016 | Teplitsky et al. | |
| 2002/0087950 A1 | 7/2002 | Brodeur et al. | |
| 2002/0169999 A1* | 11/2002 | Bhansali | G06F 8/44 714/26 |
| 2002/0174416 A1 | 11/2002 | Bates et al. | |
| 2003/0061600 A1* | 3/2003 | Bates | G06F 11/3664 717/133 |
| 2003/0088854 A1 | 5/2003 | Wygodny et al. | |
| 2003/0221186 A1* | 11/2003 | Bates | G06F 11/3664 717/125 |
| 2004/0049712 A1* | 3/2004 | Betker | G06F 11/3648 714/35 |
| 2005/0039169 A1 | 2/2005 | Hsu et al. | |
| 2005/0273490 A1 | 12/2005 | Shrivastava et al. | |
| 2006/0059146 A1 | 3/2006 | McAllister et al. | |
| 2006/0212867 A1 | 9/2006 | Fields et al. | |
| 2006/0288332 A1 | 12/2006 | Sagar et al. | |
| 2006/0294158 A1* | 12/2006 | Tsyganskiy | G06F 8/72 |
| 2007/0074168 A1 | 3/2007 | Bates et al. | |
| 2007/0168997 A1 | 7/2007 | Tran | |
| 2007/0240125 A1 | 10/2007 | Degenhardt et al. | |
| 2008/0155330 A1 | 6/2008 | Van Wyk et al. | |
| 2008/0209354 A1 | 8/2008 | Stanek et al. | |
| 2008/0295077 A1 | 11/2008 | Sengupta et al. | |
| 2009/0089801 A1 | 4/2009 | Jones et al. | |
| 2009/0249309 A1 | 10/2009 | Li et al. | |
| 2009/0254821 A1 | 10/2009 | Cates | |
| 2009/0307528 A1 | 12/2009 | Byers et al. | |
| 2010/0005249 A1* | 1/2010 | Bates | G06F 11/3664 711/154 |
| 2010/0042981 A1 | 2/2010 | Dreyer et al. | |
| 2011/0099538 A1 | 4/2011 | Naidu Pujala et al. | |
| 2011/0131295 A1 | 6/2011 | Jolfaei | |
| 2011/0131553 A1 | 6/2011 | Singh | |
| 2011/0137820 A1 | 6/2011 | Reisbich et al. | |
| 2011/0145800 A1 | 6/2011 | Rao et al. | |
| 2011/0283247 A1* | 11/2011 | Ho | G06F 11/3636 716/107 |
| 2011/0283266 A1 | 11/2011 | Gallagher et al. | |
| 2011/0289482 A1 | 11/2011 | Bentley | |
| 2011/0307871 A1 | 12/2011 | Branda et al. | |
| 2012/0005659 A1 | 1/2012 | Bonanno et al. | |
| 2012/0033135 A1 | 2/2012 | Spinelli | |
| 2012/0096441 A1 | 4/2012 | Law et al. | |
| 2012/0102460 A1 | 4/2012 | Bates | |
| 2012/0192151 A1* | 7/2012 | Parkes | G06F 8/34 717/120 |
| 2012/0266140 A1 | 10/2012 | Bates | |
| 2012/0324236 A1 | 12/2012 | Srivastava et al. | |
| 2013/0019227 A1* | 1/2013 | Chiu | G06F 11/3628 717/125 |
| 2013/0205280 A1* | 8/2013 | Bragdon | G06F 11/3664 717/125 |
| 2013/0263094 A1 | 10/2013 | Bates et al. | |
| 2013/0283243 A1 | 10/2013 | Bates et al. | |
| 2013/0318504 A1 | 11/2013 | Eker et al. | |
| 2014/0007058 A1 | 1/2014 | Bates et al. | |
| 2014/0033178 A1* | 1/2014 | Sasikumar | G06F 11/3628 717/125 |
| 2014/0040669 A1 | 2/2014 | Davis et al. | |
| 2014/0068569 A1 | 3/2014 | Goldin et al. | |
| 2014/0115566 A1 | 4/2014 | Cao | |
| 2014/0282415 A1 | 9/2014 | Ovadia et al. | |
| 2014/0317602 A1 | 10/2014 | Zuo | |
| 2014/0351795 A1* | 11/2014 | Alfieri | G06F 11/362 717/125 |
| 2014/0366007 A1 | 12/2014 | Koltachev et al. | |
| 2014/0372990 A1* | 12/2014 | Strauss | G06F 11/362 717/133 |
| 2015/0143344 A1 | 5/2015 | Davis | |

OTHER PUBLICATIONS

Tucek, et al., "Triage: Diagnosing Production Run Failures at the User's Site", In Proceedings of 21st ACM Symposium on Operating Systems Principles, Oct. 14, 2007, 14 pages.

Jana, Abhijit, "Mastering Debugging in Visual Studio 2010—A Beginner's Guide", Published on: May 6, 2010, Available at: http://www.codeproject.com/Articles/79508/Mastering-Debugging-in-Visual-Studio-A-Beginn.

"Using the StreamInsight Event Flow Debugger", Retrieved on: Aug. 26, 2014, Available at: http://technet.microsoft.com/en-us/library/ff518532(v=sql.111).aspx.

"Production Debugging for .NET Framework Applications", Published on: Nov. 2002, Available at: http://msdn.microsoft.com/en-us/library/ee817659.aspx.

"When Application Performance is Better, Business Works Better", In White Paper of HP, Jun. 2010, 12 pages.

"Monitoring and Diagnosing Production Applications Using Oracle Application Diagnostics for Java", An Oracle White Paper, Dec. 2007, 6 pages.

Polozoff, Alexandre, "Proactive Application Monitoring", Published on: Apr. 9, 2003, Available at: http://www.ibm.com/developerworks/websphere/library/techarticles/0304_polozoff/polozoff.html.

"Collecting Performance Snapshots Using vm-Support", vmware® Knowledge Base, Retrieved Date: Apr. 20, 2012, 1 Page.

"Debug Navigator Help: Using Debug Gauges", Retrieved from <<https://developer.apple.com/library/mac/recipes/xcode_help-debug_navigator/articles/using_debug_gauges.html#//apple_ref/doc/uid/TP40010432-CH8-SW1>>, Retrieved on: May 28, 2014, 3 Pages.

"Debugging Dynamic Memory Usage Errors Using HP WDB", Hewlett-Packard Development Company, L.P., Jan. 2010, 113 Pages.

"Debugging Programs in a Production Environment", Retrieved From <<http://www.ibm.com/support/knowledgecenter/SSQ2R2_9.0.1/com.ibm.ent.dbt.zos.doc/topics/eqabug0049.htm>>, Retrieved on: Sep. 26, 2014, 5 pages.

"Debugging with GDB: the GNU Source-Level Debugger", Free Software foundation, Inc. , Dec. 15, 2010, 621 Pages.

"Details, Microsoft Knowledge Base", Available at: http://www.microsoft.com/products/ee/transform.aspx?evtsrc=microsoft.reportingservices.diagnostics.utilities.errorstrings.resources.strings&evtid=rsreporthistorynotfound&prodname=sql%20server%20reporting%20services&prodver=8.00&lcid=1033, Retrieved Date: Apr. 20, 2012, 1 Page.

"Get history and other info about your code", Retrieved From <<https://msdn.microsoft.com/en-us/library/dn289218.aspx>>, Retrieved on: May 23, 2014, 15 pages.

"Microsoft Codelens Code Health Indicator Extension", Retrieved From <<https://visualstudiogallery.msdn.microsoft.com/f85a7ab9-b4c2-438c-a6e5-0f06e0bac16d>>, Retrieved on: May 23, 2014, 2 Pages.

(56) References Cited

OTHER PUBLICATIONS

"New CodeLens Indicator-Incoming Changes", Retrieved From <<https://blogs.msdn.microsoft.com/visualstudioalm/2014/03/03/new-codelens-indicatorincoming-changes/>>, Retrieved on: Mar. 3, 2014, 7 Pages.

"Xcode OpenGL ES Tools Overview", Retrieved From <<https://developer.apple.com/library/ios/documentation/3DDrawing/Conceptual/OpenGLES_ProgrammingGuide/ToolsOverview/ToolsOverview.html>>, Mar. 10, 2014, 13 Pages.

"Xcode Overview", Retrieved From <<https://developer.apple.com/library/ios/documentation/ToolsLanguages/Conceptual/Xcode_Overview/DebugYourApp/DebugYourApp.html>>Retrieved on: Mar. 10, 2014, 18 Pages.

"Non Final Office Action Received for U.S. Appl. No. 13/567,034", Mailed Date: Apr. 4, 2014, 19 pages.

"Notice of Allowance Received for U.S. Appl. No. 13/567,034", Mailed Date: Aug. 8, 2014, 5 Pages.

"Final Rejection Received for U.S. Appl. No. 14/083,157", Mailed Date: Mar. 17, 2016, 23 pages.

"Non-Final Rejection Received in U.S. Appl. No. 14/083,157", Mailed Date: Sep. 17, 2015, 24 pages.

"Non-Final Rejection Received in U.S. Appl. No. 14/527,568", Mailed Date: Jun. 17, 2016, 12 pages.

"Final Rejection Received for U.S. Appl. No. 14/563,822", Mailed Date: Jul. 22, 2016, 16 pages.

"Non-Final Rejection Received in U.S. Appl. No. 14/563,822", Mailed Date: Mar. 8, 2016, 18 pages.

"First Office Action and Search Report Issued in Chinese Patent Application No. 201384135.X", Mailed Date: Jul. 4, 2016, 14 Pages.

Avaya, "SCS 4.0 Diagnostics Task Based Guide", Document No. NN40010-5281ssie 1.3 SCS 4.0, 0, 2010, 53 Pages.

Graham, et al., "Gprof: A Call Graph Execution Profiler", In Proceedings of the SIGPLAN Syposium on Compiler Construction, vol. 17, Issue 6, Jun. 1, 1982, pp. 120-126.

Khouzam, Marc, "Real-Time Debugging Using GDB Tracepoints and Other Eclipse Features", In GCC Summit, Oct. 26, 2010; 44 Pages.

Lee, et at, "A Development of Remote Tracepoint Debugger for Run-time Monitoring and Debugging of Timing Constraints on Qplus-P RTOS", In Proceedings of the IEEE Workshop on Software Technologies for Furture Embedded Systems, May 15, 2003, 4 Pages.

Luk, et al., "Pin: Building Customized Program Analysis Tools with Dynamic Instrumentation", In Proceedings of the 2005 ACM SIGPLAN Conference on Programming Language Design and Implementation, vol. 40, Issue 6, Jun. 12, 2005, pp. 190-200.

Malony, et al., "Overhead Compensation in Performance Profiling", In Lecture Notes in Computer Science vol. 3149, Oct. 2004, 14 Pages.

Nethercote, et al., "Valgrind: A Framework for Heavyweight Dynamic Binary Instrumentation", In Proceedings of the 28th ACM SIGPLAN Conference on Programming Language Design and Implementation, vol. 42, Issue 6, Jun. 1, 2007, pp. 89-100.

"International Preliminary Report and Written Opinion issued for PCT Application No. PCT/US2013/053110", Mailed Date: Nov. 11, 2013, 10 Pages.

"International Preliminary Report on Patentability Issued In PCT Application Number PCT/US2014/065592", Mailed Date: Jan. 28, 19 Pages.

"International Search Report and Written Opinion Issued in PCT Application No. PCT/US2014/065592", Mailed Date: May 18, 2015, 19 Pages.

"Second Written Opinion Issued in PCT Application No. PCT/US2014/065592", Mailed Date: Oct. 28, 2015, 6 Pages.

"International Preliminary Report on Patentability Issued in PCT Application No. PCT/US2015/032089", Mailed Date: Jun. 29, 2016, 9 Pages.

"International Search Report & Written Opinion Received for PCT Application Number PCT/US2015/032089", Mailed Date: Jul. 31, 2015, 11 Pages.

"Second Written Opinion Issued in PCT Application No. PCT/US2015/032089", Mailed Date: Apr. 12, 2016, 8 Pages.

"International Search Report & Written Opinion Received for PCT Application No. PCT/US2015/057276", Mailed Date, Jan. 21, 2016, 18 pages.

"Second Written Opinion Issued in PCT Application No. PCT/US2015/057276", Mailed Date: Jul. 13, 2016, 13 Pages.

"International Search Report & Written Opinion Issued in PCT Application No. PCT/US2015/057277", Mailed Date: Dec. 3, 2015, 12 Pages.

Plank, et al., "Libckpt: A Transparent Checkpointing under Unix", In Proceedings of Usenix Winter Technical Conference, Jan. 1995, pp. 213-223.

Plank, et al., "Memory Exclusion: Optimizing the Performance of Checkpointing Systems", In Journal of Software—Practice & Experience, vol. 29, Issue 2, Feb. 1999, pp. 125-142.

Sedlacek, Jiri, "Profiling With VisualVM, Part 1", The NetBeans Profiler and VisualVM Blog, Jul. 28, 2008, 8 Pages.

Lyon-Smith, John., "Dynamic vs. Static Instrumentation—Director of Rando Technologies—Site Home—MSDN Blogs", Retrieved at <<https://blogs.msdn.microsoft.com/johnls/2006/11/15/dynamio-vs-static-instrumentation/>> Nov. 15, 2006; 1 Page.

Strein, et al., "Design and Implementation of a high-level multi-language .NET Debugger", The 3rd International Conference on .NET Technologies, May 31, 2005, pp. 57-64.

Wang, et al.,"An Effective Reversible Debugger of Cross Platform Based on Virtualization", In International Conference on Embedded Software and Systems, May 25, 2009, pp. 448-453.

"First Action Interview Pilot Program Received for U.S. Appl. No. 14/444,987", Mailed Date: Mar. 3, 2016, 4 Pages.

"Non-Final Office Action Issued in U.S. Appl. No. 14/083,157", Mailed Date: Sep. 9, 2016, 33 Pages.

"Non-Final Office Action Issued in U.S. Appl. No. 14/563,822", Mailed Date: Nov. 17, 2016, 22 Pages.

"International Preliminary Report on Patentability Issued in PCT Application No. PCT/US2015/057277", Mailed Date: Sep. 19, 2016, 7 Pages.

"International Preliminary Report on Patentability Issued in PCT Application No. PCT/US2015/057276", Mailed Date: Oct. 19, 2016, 16 Pages.

* cited by examiner

```
// Return the current thrust value of the engine at a specific time
Public float GetCurrentThrust(float time)
Flow Count:1
{
    superAwesomeControlFlow();            230
    EngineData prevData = null;           224
            Flow Count:33    Flow Count:34
    foreach (EngineData data in this.m_engineDataCollection)
    {                                                    226
        if (prevData == null)
        Flow Count:1
        {
            prevData = data;
            continue;
        }
        else
        Flow Count:32
        {
            if (prevData.m_time....
```

```
Flow Count 1 ── 234a
{
  superAwesomeControlFlow();
  // Find the elements that this time falls between and interpolate the value
  EngineData prevData = null;
           Flow Count:33   FlowCount:34
  foreach (EngineData data in this.m_engineDataCollection)                      234
      236b  {                          236a                              236
            if (prevData == null)
                 Flow Count: 1 ── 238a
                 {
                     prevData = data;                                      238
                     continue;
                 }
  Flow Count: 32 ── 240a
  {
      if (prevData.m_time <= time && time <= data.m_time)
      {
          float slope = (data.m_thrust – prevData.m_thrust) / (data.m_time – prevDa...
          float currThrust = prevData.m_thrust + slope * (time – prevData.m_time);
          return currThrust;
      }
      else
      Flow Count: 32
      {
          prevData = data;
      }
  }
}                                                                            240
                                                                             232
```

FIG. 2d

```
if (prevData == null) — 259
Flow Count: 1 — 256a
{
  prevData = data;
  continue;
}                                                         256
else — 256c
Flow Count: 32 — 258a
{
  if (prevData.m_time <= time && time <= data.m_time)
  {
      float slope = (data.m_thrust – prevData.m_thrust) / (data.m_time – prevDa...
      float currThrust = prevData.m_thrust + slope * (time – prevData.m_time);
      return currThrust;
  }
  else — 258e
  Flow Count: 32 — 258d
  {
      prevData = data;
  }
}
}
```

Flow Count: 32

```
Static void Main(string[] args)
{
  try
  {
      int y = Clam();          Flow Count 1 - 262
      int I = Squid();—————Exception "SquidException"

int z = y + I;  261
  }
  catch (SquidException e)
  {                    Flow Count 1 - 264
     System.Console.WriteLine(e.Message);
  }
  finally
  }
  }
  }
```

HISTORICAL CONTROL FLOW VISUALIZATION IN PRODUCTION DIAGNOSTICS

BACKGROUND

A debugger is a computer program that helps to find errors (bugs) in other computer programs. Functions provided by some live debuggers (debuggers that run on an executing program) include stepping: executing a program step by step, breaking: stopping the program execution at some condition or specified instruction, and inspection: displaying or otherwise providing the values of variables.

SUMMARY

A diagnostic tool can gather historical control flow information in a running (executing) production application without interrupting (stopping) the execution of the program. A live-debugging diagnostic tool can gather historical control flow information in an application to which the live debugger is attached. A representation such as a visualization of the control flow information can be provided. A program running in production can be dynamically instrumented to gather the actual control flow of the program in production. The performance consequence of the information gathering can be minimal. The gathered control flow information can be local to a single particular function invocation. That is, the information specific to a single call to a particular function can be provided. The contents of the stack frame tied to the function invocation can be displayed. The control flow through the stack frame to the point at which the information is collected can be visualized and provided to a user. Information can be combined so that a visualization of global control flow (all invocations of a particular function) can be provided.

Historical exception information in a production application can be collected. An exception occurs when an illegal operation such as dividing by zero, etc. occurs. Such an event can occur anywhere in a program and typically requires special processing that changes the normal flow of program execution. Exception information that cannot be determined by control flow analysis can be provided. The exception information that is provided can include where within a basic block derived from a function the exception occurred. The location within the basic block at which the exception occurred can be mapped back to the source line giving rise to the instruction within the basic block at which the exception occurred. A visualization of the historical control flow can be provided by a diagnostic tool. This information may enable a user (such as but not limited to a developer) to obtain more information about the execution of the program in production thus minimizing the number of iterations needed to prove or disprove a hypothesis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Diagnosing application problems in a production environment can be challenging because attaching a live debugger to a process (such as for example to a server process) stops the process from executing, thus blocking processing of requests that are currently executing. "Production" or a "production environment" as used herein refers to an environment in which the software being used has exited from the development and/or testing stage and is "in production" that is, being used to perform actual work rather than being tested. Because attaching a live debugger to a production process can disrupt the ability of the software to perform work, many developers use logging to debug production applications. Logging uses a function such as printf to write what happened in a process into a logfile. The user has to guess where the logging statements need to be placed and what data needs to be captured. The application has to be redeployed whenever new logging statements are added. Redeploying the application necessitates bringing the application down, installing a new version of the application, and bringing the application back up.

Logging can have a significant impact on the performance of the application because it is always on: the application is always executing the logging statements even if nothing is going wrong. Furthermore, the only information that is available is the information that is logged, e.g., the value of the variables logged by the log statement. Some information may not be available, e.g., the architecture of the computing device may prevent the content of call stacks from being logged. Even if the content of a call stack can be logged, walking a stack is slow and is likely to have a negative effect on performance. Control flow information is not available from log files because, while a log entry appearing in a log file proves that the associated basic block was executed, the information is global, not local, that is, it is not local to a particular function invocation. Moreover, the lack of an entry in the log file does not prove that the associated basic block was not executed because unless a log statement exists in the basic block, no entry will appear in the log file whether or not the basic block was executed. Finally, the amount of logging that takes place can get out of hand because developers leave logging code in the software, necessitating complex searching to be performed to exclude log statements not currently of interest.

As described herein, production debugging describes a technology that enables a user to define events such as but not limited to breakpoints and first chance exceptions. When the event is triggered, a fast snapshot of the process can be taken but the process is not stopped. In traditional breakpoint processing that stops execution, the program executes until the breakpoint is encountered. When the breakpoint is encountered, the execution of the program stops and execution control is placed in the hands of a user. The program remains stopped until the user manually inputs a command that resumes program execution. In contrast, in accordance with aspects of the subject matter described herein, a user can inspect the entire process state at the point at which the non-stopping breakpoint was encountered without ever stopping the process. Production debugging as described herein does not stop the process. It is completely dynamic (no redeploy of software is needed). The breakpoints are easily managed. No complex log searching is needed. There are no source code changes to the source code. The process has minimal overhead on the running server process.

Production debugging as described herein, is an iterative process in which a developer creates a hypothesis for what is happening, and uses non-stopping breakpoints and/or exception events to gather production dumps that provide information about the validity of the hypothesis. It is advantageous to collect as much data as possible to reduce the number of iterations needed. In accordance with aspects of the subject matter described herein, the historical control flow (the sequence of execution of program instructions or expressions) through a function that includes a production debug event such as but not limited to a non-stopping production breakpoint, can be visualized. A user (e.g., a developer) can see the location at which the breakpoint was set, all of the program data at that point in time including variable values, and the control flow path that was taken through the function to reach the breakpoint. The control flow data presented is specific to the current instantiation of the function, and therefore relevant to a particular call.

In accordance with aspects of the subject matter described herein, control flow data can include: how many times each of the control flow basic blocks were executed and data about asynchronous control flow events including but not limited to exceptions that occurred during execution. This enables the display of information including but not limited to what iteration of a loop execution is currently on, whether or not an "if" or "else" path was taken leading up to the breakpoint, if an exception was thrown within a basic block (and therefore, the remaining portion of the block was not executed) and/or the type of any exception that was thrown and so on.

Historical Control Flow Visualization in Production Diagnostics

In accordance with aspects of the subject matter described herein, a production application diagnostic tool can instrument an application to collect program control flow information using a non-stopping production breakpoint. Analyzed program control flow information can be displayed. Dynamic code rewriting techniques such as but not limited to the CLR (Common Language Runtime) IL (intermediate language) rewriting mechanism can be used to change the production software without deploying new source code. The information collected at the non-stopping breakpoint can include the actual control flow that an instance of the production application took to reach the breakpoint in addition to information about the data. A representation or visualization of analyzed control flow information can be provided by a diagnostic tool allowing a user to see the path an execution of the program took to arrive at a particular breakpoint.

The instrumentation technique described herein can be implemented dynamically (based on decisions made while the program is running) using any suitable code rewriting technique. Alternatively, a debugger can also obtain such information using traditional stopping breakpoints instead. A user such as a developer, for example, cannot interact with a production debugger, so debugging techniques can be more iterative than they are with a live debugger. In a live debug session, a debugger is attached to an executing process. When a breakpoint is encountered, the process is stopped and the user (e.g., developer) is typically able to inspect the state of the process. The current values of variables can often be inspected. The call stack can often be inspected. To see the control flow data, the user may be able to step through the code, executing one line or one expression at a time. A command input by the user can cause the execution of the program to resume. In a production environment the consequence of live debugging is that users interacting with the application are blocked until the process resumes. Because blocking users is typically unacceptable, historical debugging is typically used for debugging programs in a production environment. The user debugging a production application typically develops a hypothesis for the cause of the problem, and uses known production debugging techniques like logging to gather information to prove or disprove the hypothesis. Typically control flow data is not available.

In accordance with aspects of the subject matter disclosed herein, control flow instrumentation can perform basic block analysis on the program's instructions at runtime. Each basic block can be assigned an iteration count which is stored in a local variable for the function in question. The instruction address of the basic block can also be stored in a local variable for the function in question. Each time a basic block is executed, the execution count local variable for the basic block can be incremented, thus counting the number of executions of the basic block for the particular function invocation.

Because count information is stored in memory, it can be copied to diagnostic artifacts when a non-stopping production breakpoint is hit. Diagnostic artifacts include but are not limited to the process itself, snapshots of the process, and process dumps. Diagnostic artifacts can be used as the input to diagnostic tools such as but not limited to a debugger. A snapshot can be a lightweight copy of a process where the snapshot is created efficiently without creating a full trace of the process's execution or memory. For example, an operating system can implement a lightweight snapshot mechanism on top of a virtual memory model and can use shared memory pages and copy-on-write techniques to avoid creating a complete copy of the process. Copy-on-write enables the operating system to map the actual pages of the entire address space of the original process into a second process snapshot quickly. Once the snapshots are created, a debugger can be attached to them. The snapshots can be analyzed in a manner similar to the manner in which a crash dump is analyzed. Alternatively, a collector process may be used to mine data from the snapshots. By creating multiple snapshots, the user can obtain a historical picture of what happened in the process over time. For example, the user may simulate stepping by taking several snapshots at different locations. The user can diagnose the production application by analyzing changes from snapshot to snapshot.

The diagnostic tool can obtain the values of the local variables that hold the basic block counts and instruction addresses from the diagnostic artifact. The instruction addresses can be mapped into corresponding source code using diagnostic symbol information (e.g., from information typically produced in the compilation process.) The diagnostic tool can then provide one or more visualizations of the actual control flow and execution counts at the breakpoint. The visualization can include the number of times a basic block was executed for a particular invocation of the function. The content of the basic block in question in the source code or in a disassembly view can be provided. In a "source view" the source code that was compiled into the application can be displayed. In a disassembly view the machine code the compiler generated can be displayed. The binary values of opcodes, etc. can be replaced by the symbolic opcode name.

Figure 1:
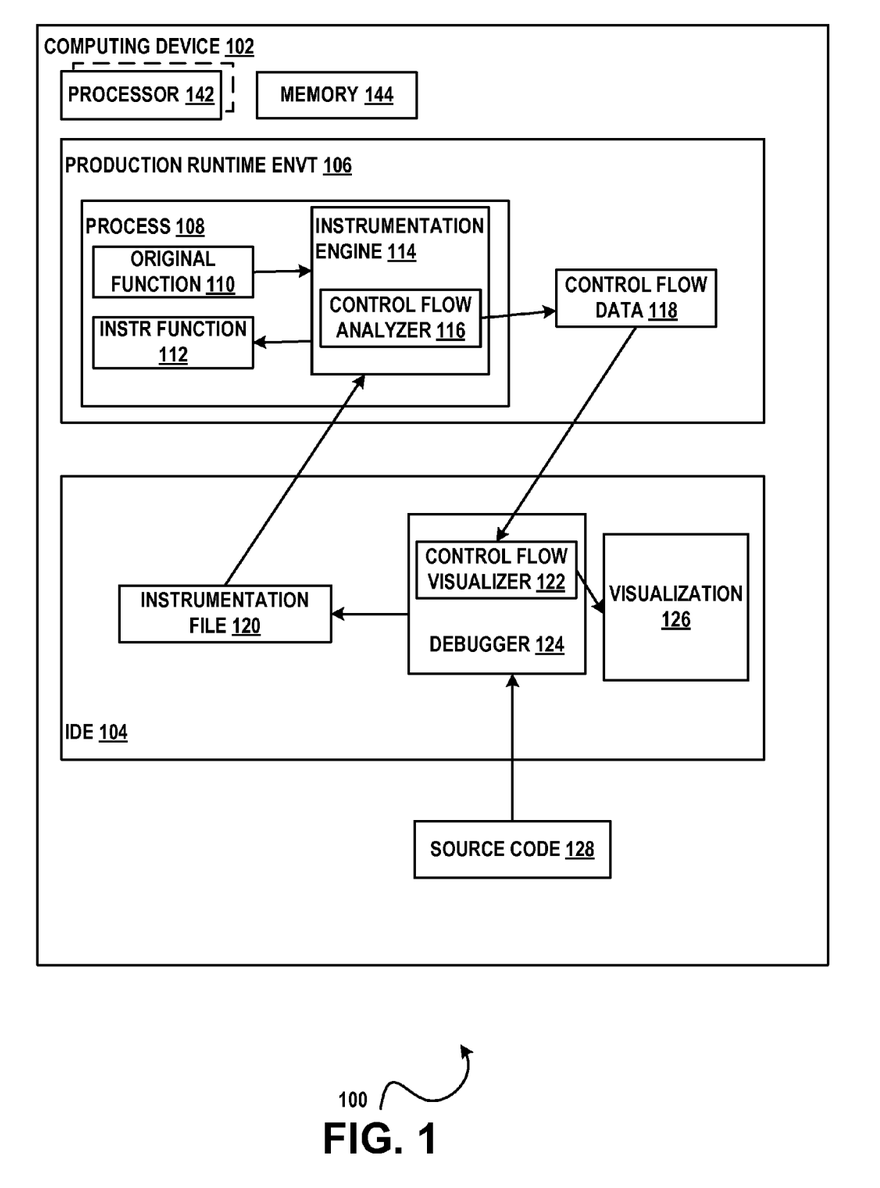
FIG. 1 illustrates an example of a system 100 that provides one or more historical control flow visualizations in accordance with aspects of the subject matter described herein.

FIG. 1 illustrates an example of a system 100 that can provide a visualization of historical control flow in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 may execute wholly or partially within an IDE such as IDE 104 or can execute wholly or partially outside an IDE. IDE 104 can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 100 may include any one of or any combination of program modules comprising: an instrumentation engine such as instrumentation engine 114, and/or a debugger or diagnostic tool such as debugger 124. A debugger or diagnostic tool such as debugger 124 can include a control flow visualizer such as control flow visualizer 122. Alternatively, the control flow visualizer can be external to the diagnostic tool. An instrumentation engine such as instrumentation engine 114 can include a control flow analyzer such as control flow analyzer 116. System 100 can include a runtime environment such as production runtime environment 106. The runtime environment can be a development, staging or testing environment. System 100 can include a second environment such as but not limited to a development environment represented in FIG. 1 by IDE 104.

In accordance with some aspects of the subject matter described herein, a user may insert debug statements such as but not limited to non-stopping breakpoints into source code such as source code 128. A debugger 124 may convert the debug statements into an instrumentation file such as instrumentation file 120. The instrumentation file may be provided to an instrumentation engine 114. The instrumentation engine 114 can dynamically, without taking down or stopping the executing process 108, instrument an original function 110 to create an instrumented function 112. The next time the function is invoked, the instrumented function 112 can be executed instead of the original function 110. In accordance with some aspects of the subject matter described herein, the original function 110 is rewritten to create the instrumented function 112 using an IL rewriting mechanism. In accordance with some aspects of the subject matter described herein, the original function 110 is rewritten to create the instrumented function 112 by the instrumentation engine 114.

A control flow analyzer such as control flow analyzer 116 may analyze the control flow. For example, referring now to the example 200 of FIG. 2a, suppose a function such as an example function 160 includes 6 instructions: instruction 161a, instruction 2 161b, instruction 3 161c, instruction 4 161d, instruction 5 161e, and instruction 6 161f. In an instruction with no control flow impact, the next instruction to execute, is the next instruction in the sequence. For example, if instruction 1 161a has no control flow impact, the next instruction that executes is instruction 2 161b. Some instructions such as jumps, branches, calls and so on have control flow impact. If, for example, instruction 1 161a is a call, the next instruction to execute will typically not be instruction 2 161b, it will be some other instruction at some other location. A basic block includes the range of instructions that do not have control flow impact or that have the same control flow impact. For example, if instructions 1, 2, 3, 4 and 5 all execute in sequence instructions 1, 2, 3, 4 and 5 will be placed into a single basic block. If instructions 6, 7 and 8 all force control to execute at a different location, instructions 6, 7 and 8 are grouped into a different basic block. The fact that the instruction jumps to another location causes a new basic block to start at that location.

Figure 2A:
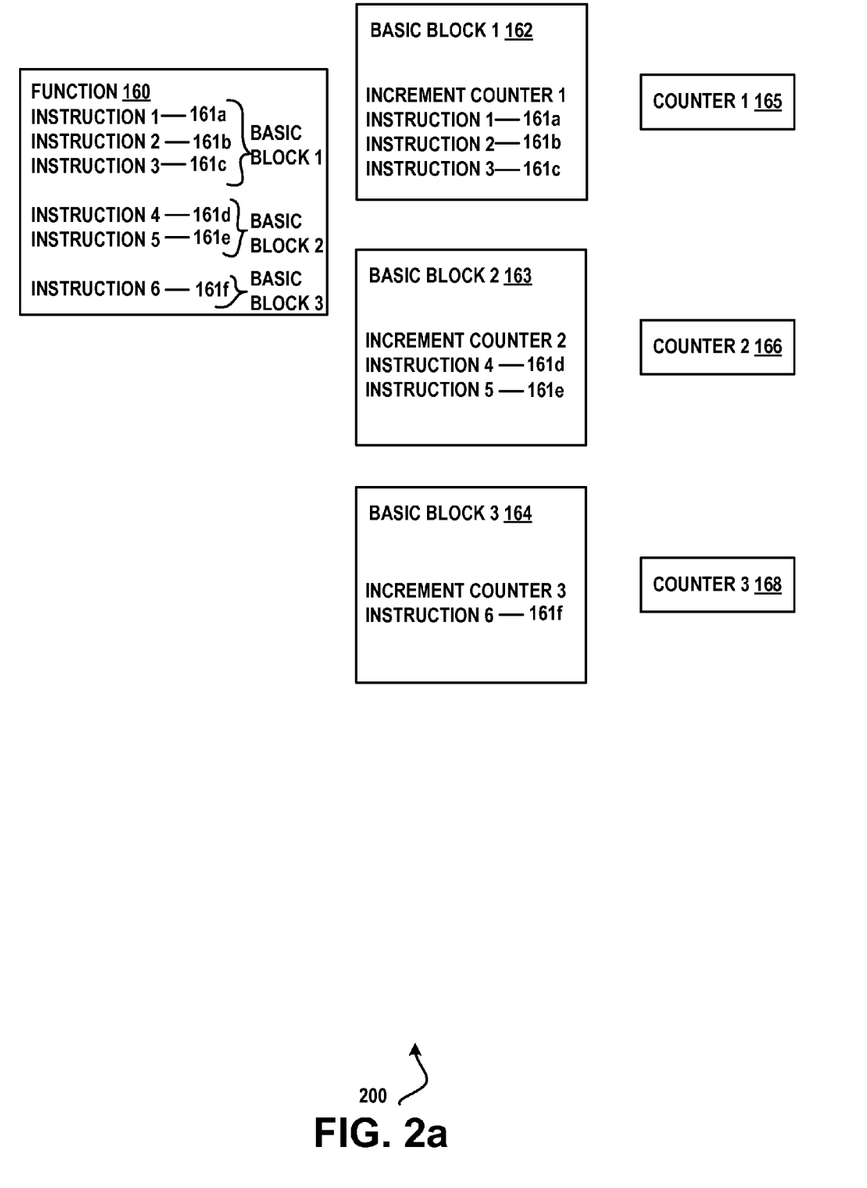
FIG. 2a illustrates an example of a function and resulting instrumented basic blocks in accordance with aspects of the subject matter disclosed herein.

In accordance with some aspects of the subject matter described herein the concept of the basic block is used to determine how the flow through the function is going to occur. Control flow analyzer 116 may determine that the instructions instruction 1 161a, instruction 2 161b and instruction 3 161c are executed sequentially but that instruction 4 161d will jump to another location, Suppose control flow analyzer 116 determines that instructions instruction 4 161d and instruction 5 161e execute sequentially but that instruction 6 161f jumps to a third location. The instructions instruction 1 161a, instruction 2 161b and instruction 3 161c may be placed in a first basic block, basic block 1 162. The instructions instruction 4 161d and instruction 5 161e can be placed in a second basic block, basic block 2 163 and instruction 6 161f can be placed in a third basic block, basic block 3 164. Additional instructions (instrumentations) can be added to the basic block. For example, whenever basic block 1 162 is executed a counter (e.g., counter 1) can be incremented. A local variable that holds the value of the counter (e.g., counter 1 165) for the basic block can thus include the number of times basic block 1 was executed. Similarly a counter for basic block 2 163, e.g., counter 2 166 can be incremented whenever basic block 2 163 is executed and a counter for basic block 3 164, e.g., counter 3 168 can be incremented whenever basic block 3 164 is executed.

An exception can also change the control flow of a function. An exception can occur at any time. An exception occurs whenever the normal control flow cannot be executed. Instead, processing continues at the catch block to handle something that went wrong. For example, suppose when a calculation is performed, a division by zero occurs. This is an illegal operation for which an exception can be thrown. In accordance with aspects of the subject matter described herein, information concerning where in the basic block the exception was thrown, which instruction within the sequence the exception was thrown at, and what the type of that instruction is that caused the exception to be thrown can be displayed.

Referring again to FIG. 1, when a non-stopping breakpoint is encountered in the instrumented function or when an asynchronous control flow event such as an exception occurs, control flow data 118 can be captured. Control flow data 118 can be a snapshot that includes all information in memory for the process 108. Control flow data 118 can be one or more snapshots comprising lightweight copies of the process where the snapshot is created efficiently without creating a full trace of the process's execution or memory. When a diagnostic tool as described herein is attached to the control flow data 118, the tool can read the values of the basic blocks which includes where in the sequence of instructions the basic block starts and ends and the number of times the basic block actually executed for that invocation. A visualization of the aggregated data can be provided so that the flow through the function can be visualized. Control flow data 118 can be received by control flow visualizer 122. In accordance with some aspects of the subject matter described herein, a live-debugging tool can set internal live (stopping) breakpoints on each basic block to collect the control flow information. When such a breakpoint is encountered, the live debugging tool can increment its own counter for the basic block. A live debugger may also use an instrumentation based model if the debugger can support debugging instrumented code. Control flow visualizer 122 can format the control flow data 118 into various visualizations, e.g., visualization 126, as shown in FIGS. 2c, 2d, 2e and 2f.

Figure 2B:
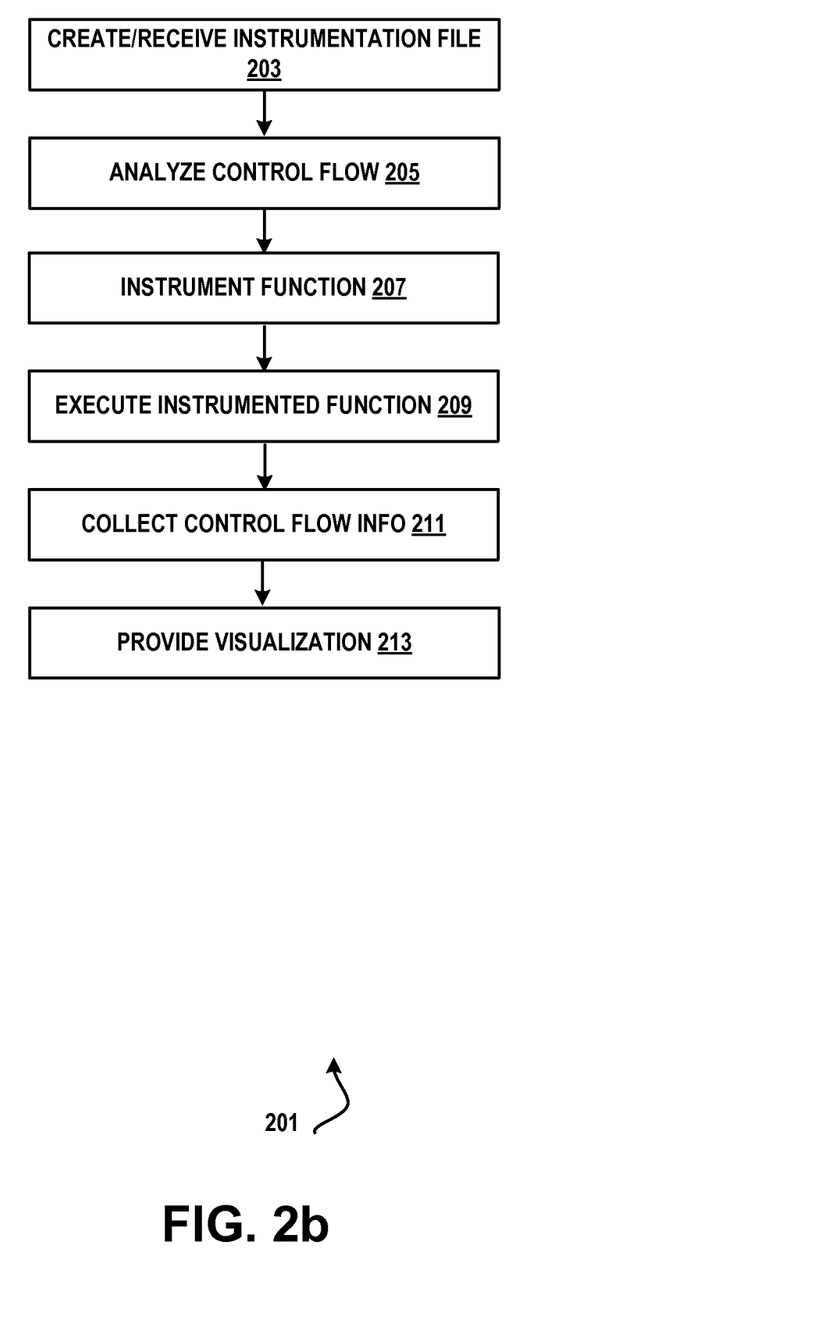
FIG. 2b illustrates an example of a method 201 of visualizing a historical control flow in accordance with aspects of the subject matter disclosed herein.

FIG. 2b illustrates an example of a method 201 for analyzing control flow information. Visualization of control flow information of an instrumented function may be provided. The method described in FIG. 2b can be practiced by a system such as but not limited to the one described with respect to FIG. 1. While method 201 describes a series of steps or operations that are performed in a sequence, it is to be understood that method 201 is not limited by the order of the sequence depicted. For instance, some operations may occur in a different order than that described. In addition, one operation may occur concurrently with another operation. In some instances, not all operations described are performed.

At operation 203 an instrumentation file can be received. The instrumentation file can be received from a development, test or staging computing machine. The instrumentation file can be received by a production runtime environment on the same computing device or on another computing device. At operation 205 the control flow of the function can be analyzed as described above. The control flow can be analyzed by a program module loaded into a memory connected to a processor of a computing device. In accordance with some aspects of the subject matter described herein, during this operation, the state of the IL that makes up a function can be inspected. The impact on the control flow of each instruction can be determined. All the instructions which jump to another location or make a call to another location can be determined. From this information, instructions that are executed in sequence can be placed in the same basic block and an instruction that executes at a different location (e.g., because of a call statement or a jump) can be placed in a new basic block.

Another time when instructions in a function are not executed in sequence is when an exception is thrown. An exception is raised whenever an illegal operation such as dividing by zero or dereferencing a null pointer is encountered. In the first phase of an exception called a first chance exception, a search for a handler for the exception is performed. The second chance phase occurs if no one has caught the exception. Second chance exceptions are typically rare in a production environment. In accordance with aspects of the subject matter described herein, the location within the basic block at which the exception was thrown (e.g., the point at which the first chance notification was received), the type of that exception and where the catch block logic was executed can be captured and displayed to a user. The type of the exception is useful to a user in part because the type of the exception is usually strongly related to language constructs such as object type.

At operation 207 the function can be instrumented to produce an instrumented function that is executed the next time the function is called. The function can be instrumented by one or more program modules loaded into a memory connected to a processor of a computing machine. At operation 209 the instrumented function can be executed. The instrumented function can be executed by a processor of a computing device. The instrumented function can be executed multiple times until a non-stopping breakpoint is reached. The non-stopping breakpoint can cause control flow information to be collected at operation 211. The control flow information can be in the form of a snapshot of the process. The control flow information can be received by a diagnostic tool or debugger that includes a control flow visualizer. At operation 213 a visualization of the control flow can be generated. The visualization can be generated by a program module loaded into a memory connected to a processor of a computing device. The visualization may be provided as a display, report, written to a storage medium or by any means known to those of skill in the art.

Figure 2C:
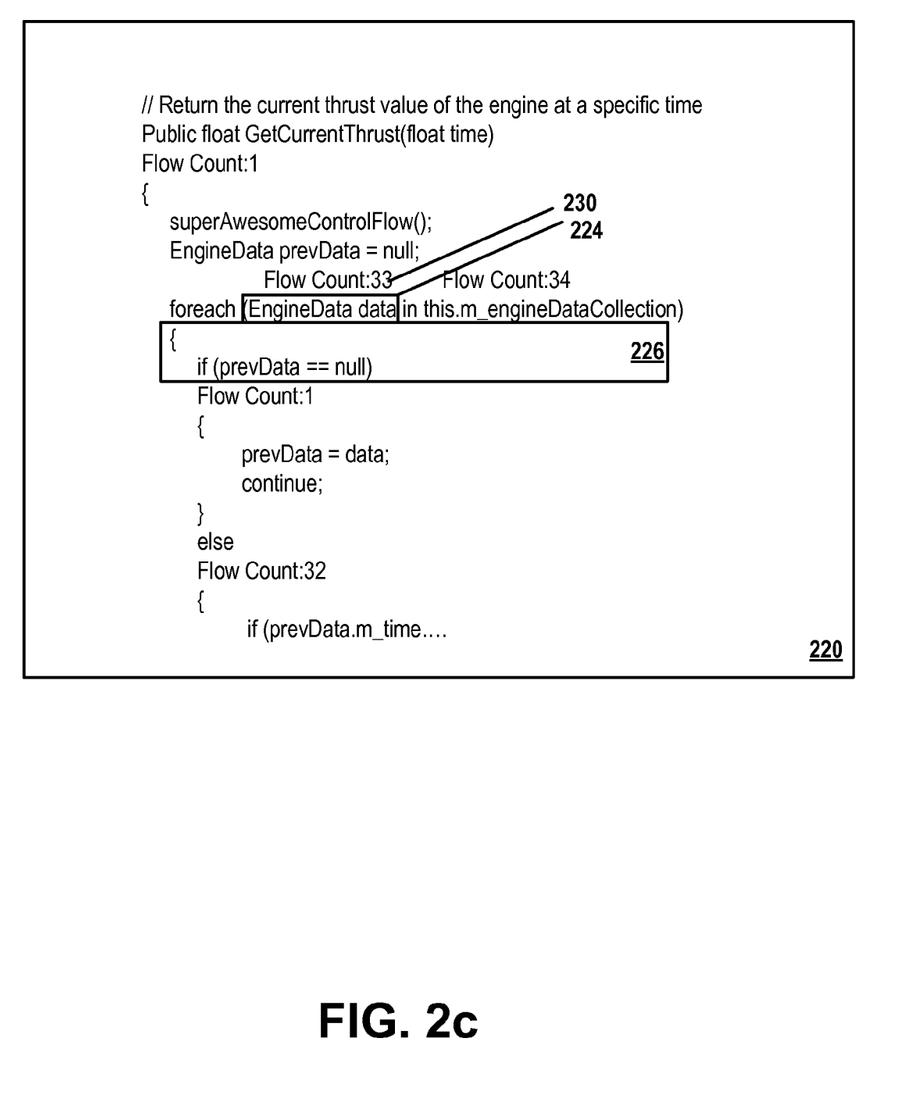
FIG. 2c illustrates an example of a visualization of historical control flow in accordance with aspects of the subject matter disclosed herein.

FIG. 2c is an example of a visualization 220 of control flow information in accordance with aspects of the subject matter described herein. In visualization 220 in response to selecting a flow count indication by clicking on or otherwise selecting the flow count indication (e.g., clicking on "Flow Count=33" flow count indication 230) the associated basic block instructions, mapped back into the source code from which the compiled code was derived, can be highlighted. Sections of code are referenced by placing numerically labeled boxes around the code section. In FIG. 2c the code in the box labeled with the reference numeral 224 "Engine-Data data" and the code within the box labeled with the reference numeral 226 are the sections of code associated with flow count indication 230. These sections of code, in accordance with aspects of the subject matter described herein can be highlighted. Highlighting can include displaying the code in a colored background, bolding the code or in any way distinguishing the code from code that is not associated with the selected flow count indication. The highlighted code of visualization 220 are the lines of code that were executed 33 times before the breakpoint was hit.

Figure 2D:
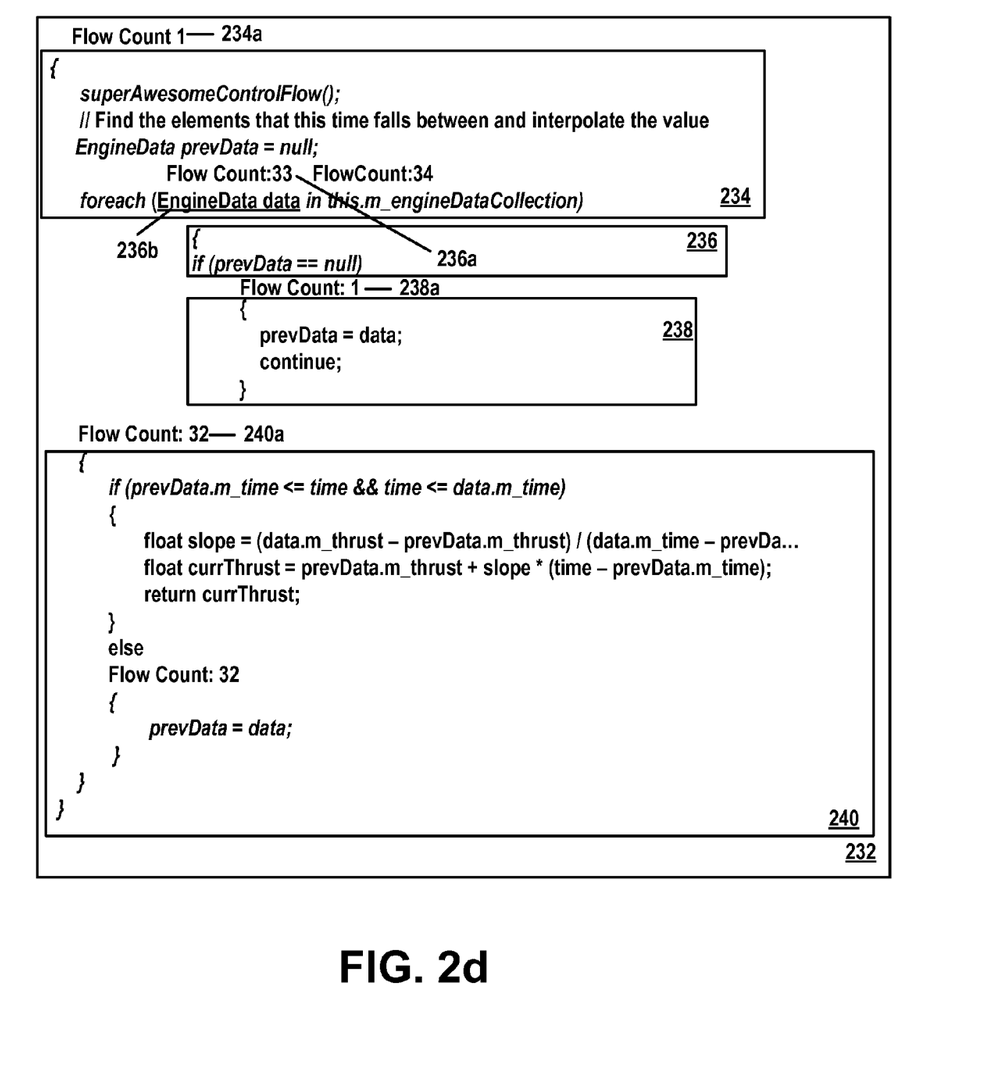
FIG. 2d illustrates another example of a visualization of historical control flow in accordance with aspects of the subject matter disclosed herein.

In accordance with some aspects of the subject matter disclosed herein, a user interface gesture may turn on highlighting of all the code corresponding to basic blocks that were executed. FIG. 2d visualization 232 is an example of such a visualization of control flow information. Visualization 232 distinguishes the source code corresponding to several basic blocks that were executed various numbers of times. In FIG. 2d, sections of code are referenced by placing numerically labeled boxes around the code section. For example, one section of code in FIG. 2d, is labeled section 234. This section of code is associated with flow count indication 234a (Flow Count: 1). Source code associated with execution of this basic block is the italicized code in section 234. The italicized code in accordance with aspects of the subject matter described herein can be highlighted in the visualization displayed to a user. For example, the code indicated by italics can be highlighted by displaying this code with a background of a first color (e.g., yellow).

In section 236 the code that is italicized is an example of source code corresponding to basic block code that was executed 33 times, as indicated by flow count indication 236a. Also associated with flow count indication 236a is the underlined code (code 236b) of section 234. The code associated with flow count indication 236a can be highlighted and distinguished from the code associated with flow count indication 234a by displaying the code associated with flow count indication 236a in a second color, (e.g., blue). A third section of code, section 238 can be code associated with flow count indication 238a "Flow Count: 1". The code in section 238 can be highlighted and distinguished from the code associated with flow count indication 234a and flow count indication 236a by displaying the code associated with flow count indication 238a in a third color, (e.g., red).

Figure 2E:
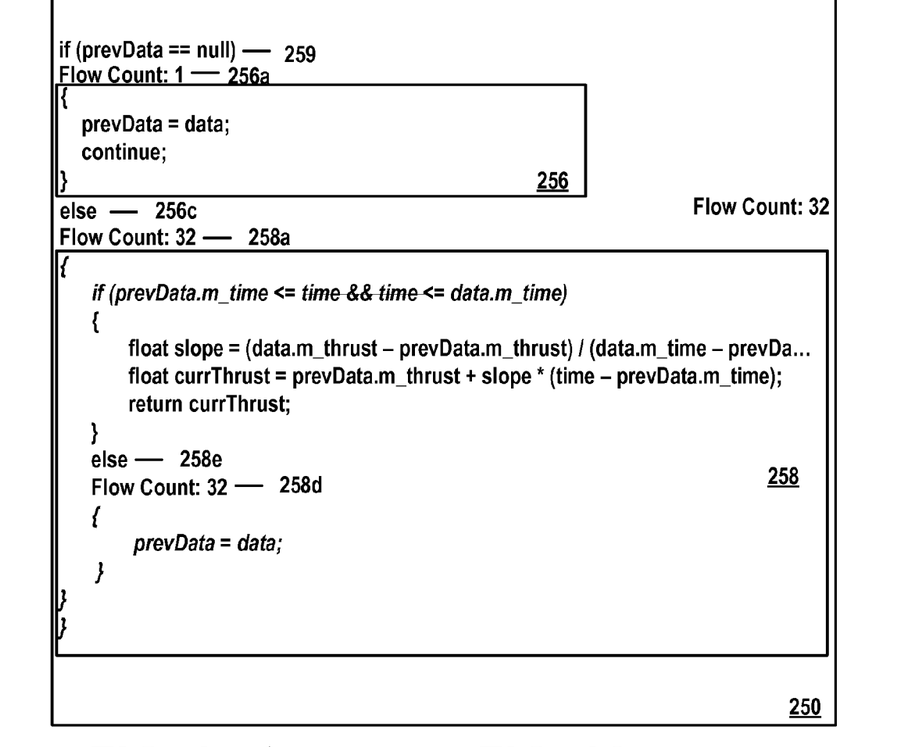
FIG. 2e illustrates another example of a visualization of historical control flow in accordance with aspects of the subject matter disclosed herein.

Finally, fourth section of code, section 240 can be code associated with flow count indication 240a "Flow Count: 32". The italicized code in section 240 can be highlighted and distinguished from the code associated with flow count indication 234a, flow count indication 236a and flow count indication 238a by displaying the code associated with flow count indication 240a in a fourth color, (e.g., green). Thus code associated with different basic blocks can be shown in different colors to make it easy to see where each basic block code starts and ends. In FIG. 2e visualization 250, in response to selection of flow count indication 256a and flow count indication 258a, the code associated with flow count indication 256a and flow count indication 258a is highlighted. The code 259 associated with the if clause ("if prev data==null") of basic block 256, was executed once, as flow count indication 256a ("Flow Count: 1") indicates. The else clause 256c was executed 32 times as indicated by flow count indication 258a ("Flow Count: 32"). The "if prev data==null statement" of code 259 was never executed. This is known because no flow count was displayed and the block was not highlighted. Thus the second else 258e (with the flow count of 32, flow count indication 258d) was always taken when the non-stopping breakpoint was hit. In accordance with some aspects of the subject matter disclosed herein, all the basic blocks can be highlighted in one color where the gradation of color indicates how often the block was executed.

Figure 2F:
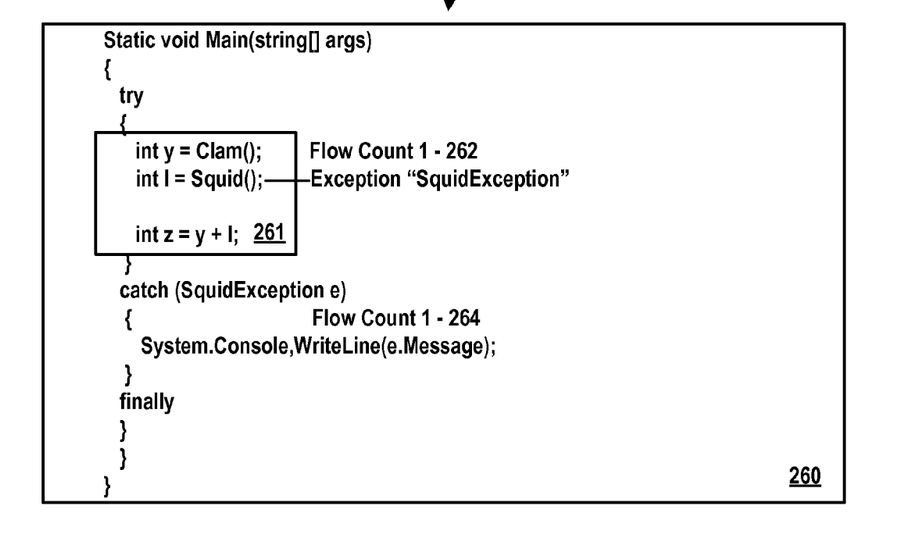
FIG. 2f illustrates another example of a visualization of historical control flow in accordance with aspects of the subject matter disclosed herein.

FIG. 2f visualization 260 illustrates an example of an exception being visualized in the middle of a basic block. The section of code that threw the exception, section 261 can be highlighted by, for example, displaying this code in a background of a color such as blue, etc. The number of times this basic block was executed before the exception was thrown is indicated by flow count indication 262 ("Flow Count: 1"). In this particular visualization only flow count indications 262 and 264 are shown.

Disclosed herein is a system including at least one processor, a memory connected to the one or more processors and a diagnostic tool. The diagnostic tool can include one or more program modules that when they are loaded into the memory enable the processor to provide a visualization of control flow data associated with invocation of a particular function. The function can be broken down into a number of basic blocks. The visualization can provide information including how many times each basic block of the function was executed in the invocation of the function. The visualization of control flow data can include exception information such as the type of the exception that was thrown when a basic block was executed. The visualization can include the instruction in the basic block at which the exception was thrown mapped to a line of a source program represented by the basic block.

The system can include one or more program modules that receive information from a diagnostic tool that gathers historical control flow information in a running production application. The system can include one or more program modules that receive information from a diagnostic tool that gathers control flow information in a live debugging session. The system of claim 1 can include one or more program modules that aggregate local control flow information for a number of invocations of a function to provide a visualization of global control flow for the function. The system can include one or more program modules that create an instrumentation file that specifies instructions to be dynamically inserted into a function during execution of the function. The system can include one or more program modules that send the instrumentation file to a production environment.

A method of using a system such as the one described above can include operations including dynamically inserting into an executing function, instructions comprising at least one non-stopping breakpoint, the instructions specified in an instrumentation file and analyzing and collecting control flow data particular to a. The control flow data can be provided to a control flow visualizer. The control flow data can be collected by creating a snapshot of process data. The control flow data can be exception information. The exception information can include the type of the exception and an instruction in a basic block at which the exception was thrown. The control flow data can be local to a particular function invocation.

Computer-readable instructions stored on a computer-readable storage medium can, when executed on a computer create an instrumentation file comprising debug statements comprising non-stopping breakpoints. Control flow information local to a particular function invocation in an application can be collected and a visualization of the control flow information can be created. The visualization can include code corresponding to the compiled code that makes up one or more basic blocks comprising the invoked function and a number of times the basic block(s) were executed. A function in an application can be dynamically instrumented to collect program control flow information without stopping execution of the application. Exception information including where in the basic block an exception was thrown and/or the type of the exception can be displayed. A path an execution of the application took to arrive at a particular breakpoint can be displayed. Debug information for a production or non-production application can be displayed.

Example of a Suitable Computing Environment

Figure 3:
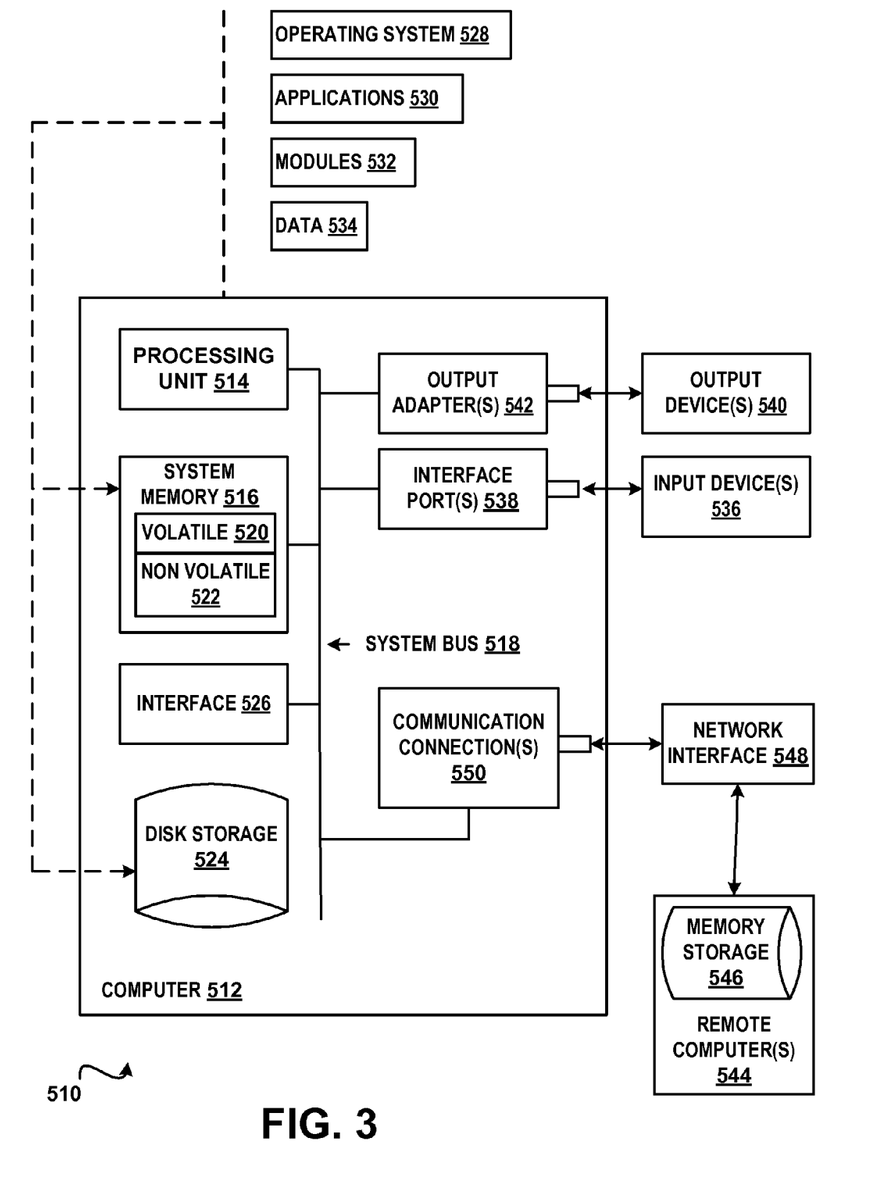
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
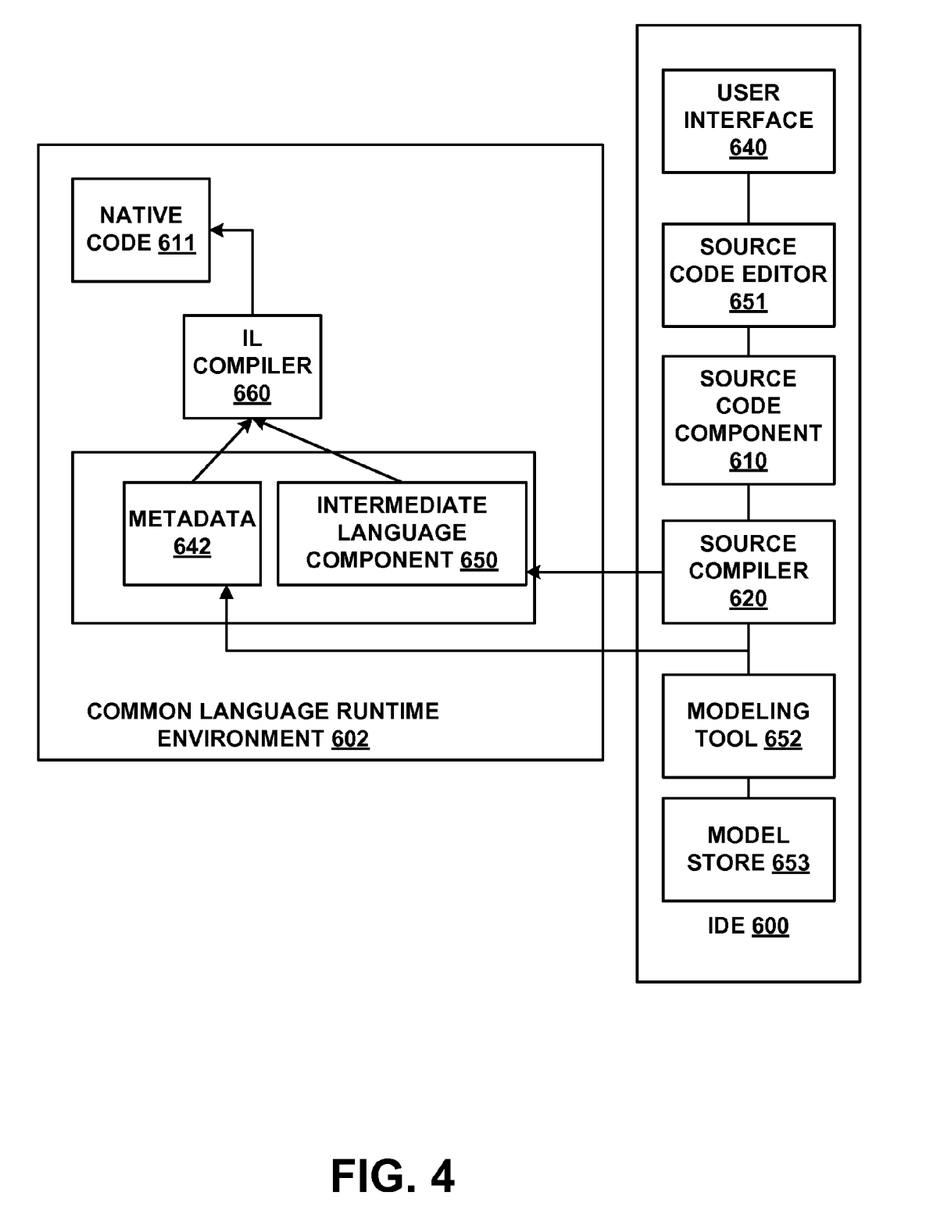
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor:
   a memory connected to the at least one processor; and
   a diagnostic tool comprising:
   at least one program module loaded into the memory, the at least one program module:
   creating an instrumentation file that specifies instructions to be dynamically inserted into a function of an application to analyze and collect control flow data associated with invocation of the function without stopping execution of the application; and
   providing a visualization of the control flow data associated with invocation of the function, the function comprising a plurality of basic blocks, the visualization including how many times each basic block of the plurality of basic blocks was executed in the invocation of the function.

2. The system of claim 1, wherein the visualization of control flow data comprises exception information comprising a type of an exception thrown in a basic block of the plurality of basic blocks and an instruction in the basic block at which the exception was thrown mapped to a line of a source program represented by the basic block.

3. The system of claim 1, further comprising at least one program module that receives information from a diagnostic tool that gathers historical control flow information in a running production application.

4. The system of claim 1, further comprising at least one program module that receives information from a diagnostic tool that gathers control flow information in a live debugging session.

5. The system of claim 1, further comprising at least one program module that aggregates local control flow information for a plurality of invocations of a function to provide a visualization of global control flow for the function.

6. The system of claim 1, further comprising at least one program module that creates an instrumentation file that specifies instructions to be dynamically inserted into a function during execution of the function.

7. The system of claim 6, further comprising at least one program module that sends the instrumentation file to a production environment.

8. A method comprising:
   dynamically inserting by at least one processor of a computing device into a function of an application, instructions comprising at least one non-stopping breakpoint, the instructions specified in an instrumentation file;
   analyzing and collecting control flow data associated with invocation of the function without stopping execution of the application; and
   visualizing at least one basic block comprising the invoked function and a number of times the at least one basic block was executed.

9. The method of claim 8, further comprising:
providing, by the at least one processor, the collected control flow data to a control flow visualizer.

10. The method of claim 8, further comprising:
collecting, by the at least one processor, control flow data by creating a snapshot of process data.

11. The method of claim 8, further comprising:
collecting, by the at least one processor, control flow data, the control flow data comprising exception information.

12. The method of claim 11, further comprising:
collecting, by the at least one processor, exception information comprising a type of the exception and an instruction in a basic block at which the exception was thrown.

13. The method of claim 12, further comprising:
collecting, by the at least one processor, control flow data local to a particular function invocation.

14. A device, comprising:
at least one processor and a memory; the at least one processor configured to:
create an instrumentation file comprising debug statements comprising non-stopping breakpoints;
gather control flow information local to a particular function invocation in an application; and
create a visualization of the control flow information, the visualization comprising at least one basic block comprising the invoked function and a number of times the at least one basic block was executed.

15. The device of claim 14, wherein the at least one processor is further configured to:
dynamically instrument a function in an application to collect program control flow information without stopping execution of the application.

16. The device of claim 14, wherein the at least one processor is further configured to:
display exception information comprising where in the at least one basic block an exception was thrown.

17. The device of claim 14, wherein the at least one processor is further configured to:
display exception information comprising a type of exception thrown.

18. The device of claim 14, wherein the at least one processor is further configured to:
display a path an execution of the application took to arrive at a particular breakpoint.

19. The device of claim 14, wherein the at least one processor is further configured to:
provide debug information for the application, the application executing in a production environment.

20. The device of claim 14, wherein the at least one processor is further configured to:
provide debug information for the application, the application executing in a non-production environment.

* * * * *